United States Patent
Berry et al.

(10) Patent No.: US 7,685,280 B2
(45) Date of Patent: Mar. 23, 2010

(54) POPULATING REQUESTS TO MULTIPLE DESTINATIONS USING A MASS REQUEST

(75) Inventors: Charles F. Berry, Apalachin, NY (US); James D. Episale, Binghamton, NY (US); Judy J. Kogut-O'Connell, Hopewell Junction, NY (US); Luella A. Korsky, Elmira, NY (US); Amy J. Snavely, Binghamton, NY (US)

(73) Assignee: International Business Machines Corporation, Armonk, NY (US)

( * ) Notice: Subject to any disclaimer, the term of this patent is extended or adjusted under 35 U.S.C. 154(b) by 371 days.

(21) Appl. No.: 11/738,622

(22) Filed: Apr. 23, 2007

(65) Prior Publication Data

US 2008/0262994 A1    Oct. 23, 2008

(51) Int. Cl.
*G06F 15/16* (2006.01)
(52) U.S. Cl. .................. 709/225; 709/202; 709/213; 709/220; 709/228; 711/147; 711/151; 711/153
(58) Field of Classification Search ................ 709/202, 709/213, 220, 225, 228; 711/147, 151, 153
See application file for complete search history.

(56) References Cited

U.S. PATENT DOCUMENTS

| | | | |
|---|---|---|---|
| 6,339,785 B1 * | 1/2002 | Feigenbaum | 709/213 |
| 7,136,895 B2 * | 11/2006 | St. Pierre et al. | 709/202 |
| 2006/0080439 A1 * | 4/2006 | Chud et al. | 709/225 |
| 2008/0155067 A1 * | 6/2008 | Rivera | 709/220 |

\* cited by examiner

*Primary Examiner*—Jinsong Hu
(74) *Attorney, Agent, or Firm*—William Schiesser; Hoffman Warnick LLC

(57) ABSTRACT

A method, system and computer program product for communicating requests to multiple destinations in a business transaction are disclosed. A mass request is communicated to a processing center, the mass request including an identification portion and a content portion. The identification portion is used to obtain a parent attribute common to requests to all destinations. The content portion is parsed to generate multiple content strings corresponding to the multiple destinations. The parent attribute and each content string is combined to generate an individual request to a respective destination.

26 Claims, 3 Drawing Sheets

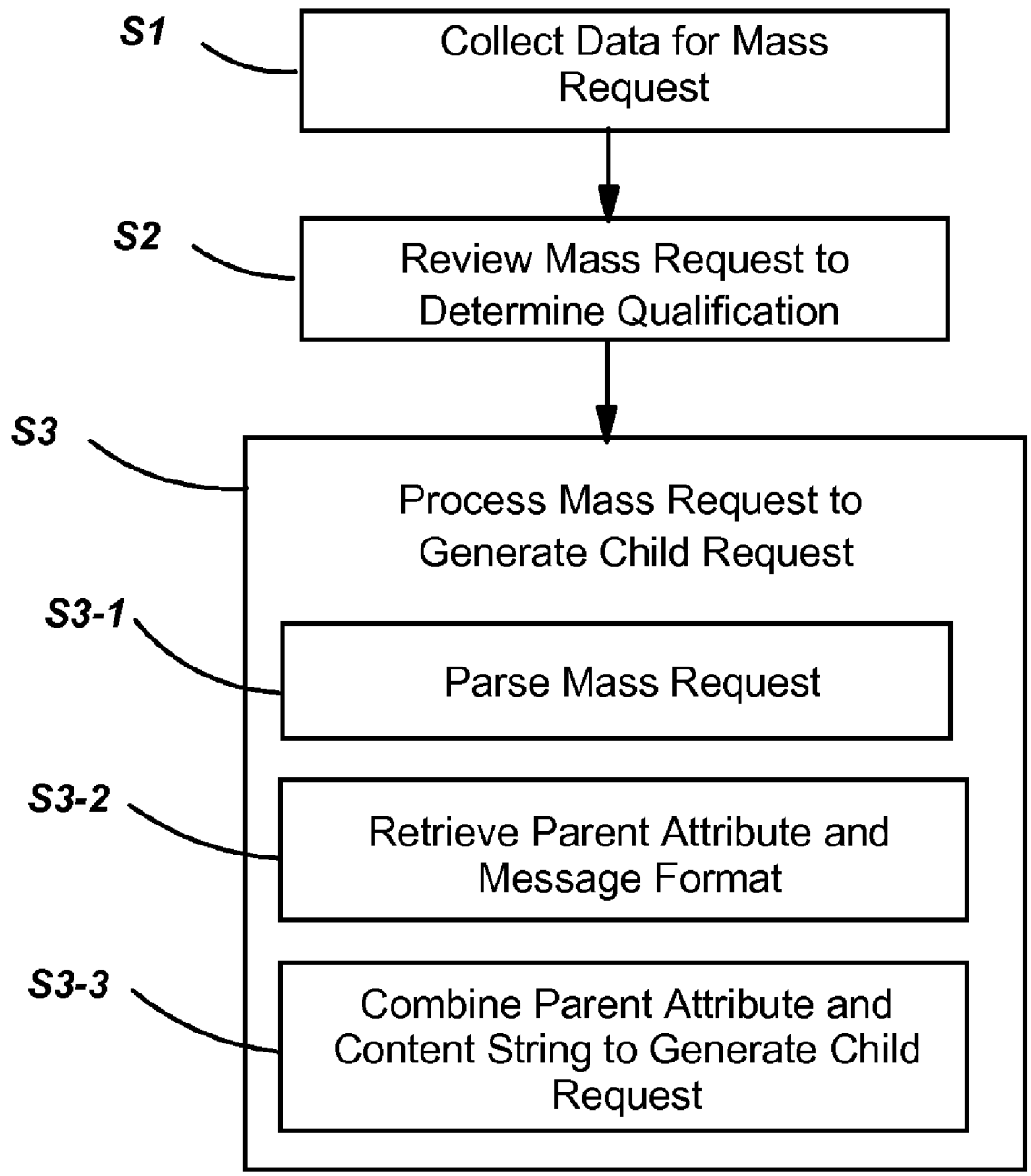

POPULATING REQUESTS TO MULTIPLE DESTINATIONS USING A MASS REQUEST

FIELD OF THE INVENTION

The present invention relates in general to electronic business, and more particularly to populating requests to multiple destinations using a mass request.

BACKGROUND OF THE INVENTION

In a typical electronic business (e-business) transaction, a transaction initiator, e.g., a buyer, may have to contact multiple suppliers. Traditionally, the multiple contacts need to be performed manually and separately by the buyer. For example, the buyer may have to manually input the requisite information specific to each of the multiple suppliers in the respective unique formats. Such manual inputs may make an e-business transaction very inconvenient such that the full potential of e-business cannot be achieved.

Based on the above, there is a need in the art for a new solution to populate multiple requests to respective multiple destinations in an e-business transaction.

SUMMARY OF THE INVENTION

A method, system and computer program product for communicating requests to multiple destinations in a business transaction are disclosed. A mass request is communicated to a processing center, the mass request including an identification portion and a content portion. The identification portion is used to obtain a parent attribute common to requests to all destinations. The content portion is parsed to generate multiple content strings corresponding to the multiple destinations. The parent attribute and each content string is combined to generate an individual request to a respective destination.

A first aspect of the invention is directed to a method for communicating requests to multiple destinations in a business transaction, the method comprising: receiving a mass request, the mass request including an identification portion and a content portion; parsing the content portion to generate multiple content strings, each content string corresponding to one destination; retrieving a parent attribute based on the identification portion; and combining the parent attribute to each content string to generate individual requests to be communicated to the respective multiple destinations.

A second aspect of the invention is directed to a system for communicating requests to multiple destinations in a business transaction, the system comprising: means for receiving a mass request, the mass request including an identification portion and a content portion; means for parsing the content portion to generate multiple content strings, each content string corresponding to one destination; means for retrieving a parent attribute based on the identification portion; and means for combining the parent attribute to each content string to generate individual requests to be communicated to the respective multiple destinations.

A third aspect of the invention is directed to a computer program product comprising: computer usable program code which, when executed by a computer system, is configured to: receive a mass request, the mass request including an identification portion and a content portion; parse the content portion to generate multiple content strings, each content string corresponding to one destination; retrieve a parent attribute based on the identification portion; and combine the parent attribute to each content string to generate individual requests to be communicated to the respective multiple destinations.

A fourth aspect of the invention is directed to a method for deploying a system for communicating requests to multiple destinations in a business transaction, the method comprising: providing a computer infrastructure being operable to: receive a mass request, the mass request including an identification portion and a content portion; parse the content portion to generate multiple content strings, each content string corresponding to one destination; retrieve a parent attribute based on the identification portion; and combine the parent attribute to each content string to generate individual requests to be communicated to the respective multiple destinations.

Other aspects and features of the present invention, as defined solely by the claims, will become apparent to those ordinarily skilled in the art upon review of the following non-limited detailed description of the invention in conjunction with the accompanying figures.

BRIEF DESCRIPTION OF THE DRAWINGS

The embodiments of this invention will be described in detail, with reference to the following figures, wherein like designations denote like elements, and wherein:

FIG. 3 shows an embodiment of the operation of a request processing system according to the invention.

It is noted that the drawings of the invention are not to scale. The drawings are intended to depict only typical aspects of the invention, and therefore should not be considered as limiting the scope of the invention. In the drawings, like numbering represents like elements among the drawings.

DETAILED DESCRIPTION OF THE INVENTION

The following detailed description of embodiments refers to the accompanying drawings, which illustrate specific embodiments of the invention. Other embodiments having different structures and operations do not depart from the scope of the present invention.

1. System Overview

Figure 1:
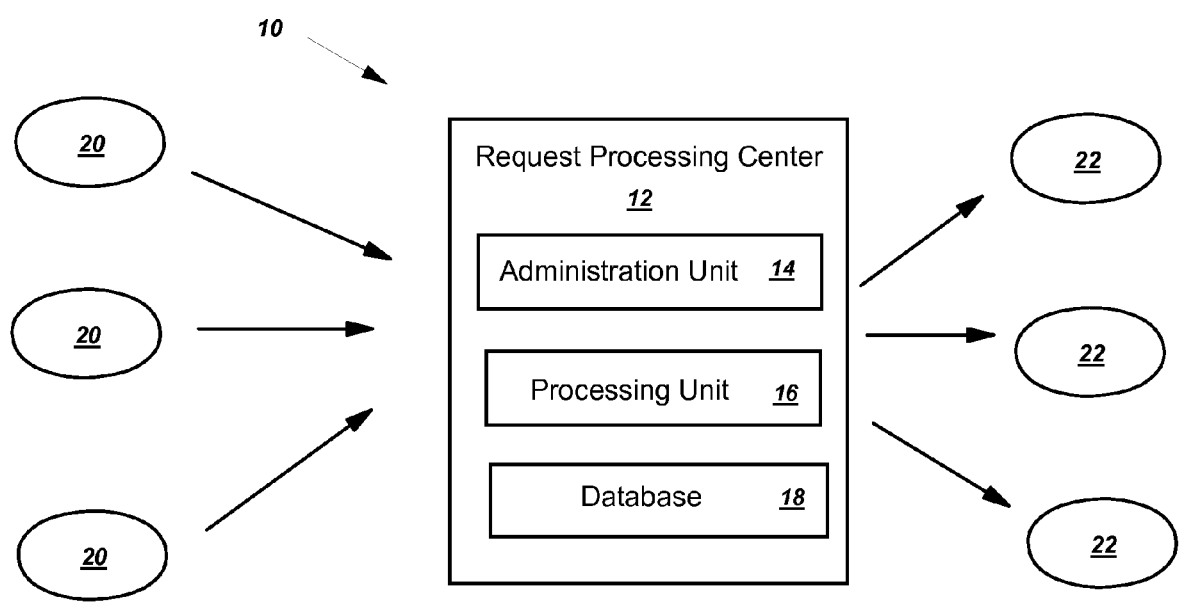
FIG. 1 shows a block diagram of a system according to an embodiment of the invention.

FIG. 1 shows a block diagram of a system 10 according to an embodiment of the invention. System 10 includes a request processing center 12. Request processing center 12 may be implemented by any system, e.g., a e-business server, that can perform the functions described below. According to an embodiment, request processing center 12 includes an administration unit 14, a processing unit 16 and a database 18. Request processing center 12 communicates with multiple initiator systems 20 and destination systems 22. In a typical e-business transaction, an initiator system 20 may need to initiate communications/transactions with more than one destination systems 22. In the following description, any communication initiated by an initiator system 20 will be referred to as a request. The communications between request processing center 12 and initiator systems 20 or destination systems 22 may be completed in any manner under any protocol and standard, and all are included in the current invention. It should be appreciated that initiator systems 20 and destination systems 22 are used only for illustrative purposes and are differentiated only regarding a specific transaction or a specific communication. That is, a system that initiates a communication is referred to as an initiator system 20. A destination system 22 in one transaction may become an initiator system 20 in another transaction, and vice versa.

In operation, initiator system 20 communicates a mass request to request processing center 12. The mass request indicates the specific destination systems 22 that are expected to be communicated/transacted with, and includes the contents of the communications to the destination systems 22. In addition, the mass request may identify itself in any manner. To this extent, according to an embodiment, a mass request includes an identification portion and a content portion. Upon receipt of the mass request, administration unit 14 may review the mass request to determine whether it is qualified to be processed. The review may be performed in any manner and based on any standard, and all are included in the invention. If administration unit 14 does not approve the mass request, the mass request will be marked as rejected and may be returned to the respective initiator system 20 or may be queued to be fixed by request processing center 12. For example, processing unit 16 may query database 18 to add information to the rejected mass request to make it ready to be processed, i.e., approved. If administration unit 14 approves the mass request, processing unit 16 may process the mass request to generate individual requests to be sent to the expected destination systems 22. According to an embodiment, processing unit 16 parses the mass request to obtain information (i.e., contents) for each individual request and generates the individual requests based on requirements, e.g., message format or protocol, of the respective destination systems 22. In generating the individual requests, processing unit 16 may need to query database 18 for necessary additional information. As the information/contents of the individual requests are generated based on the mass request, those individual requests are also referred to as child requests in the following description.

The functions of request processing center 12 may be wholly or partially implemented by a computer system 100 (FIG. 2), as will be described later.

2. Computer System

Figure 2:
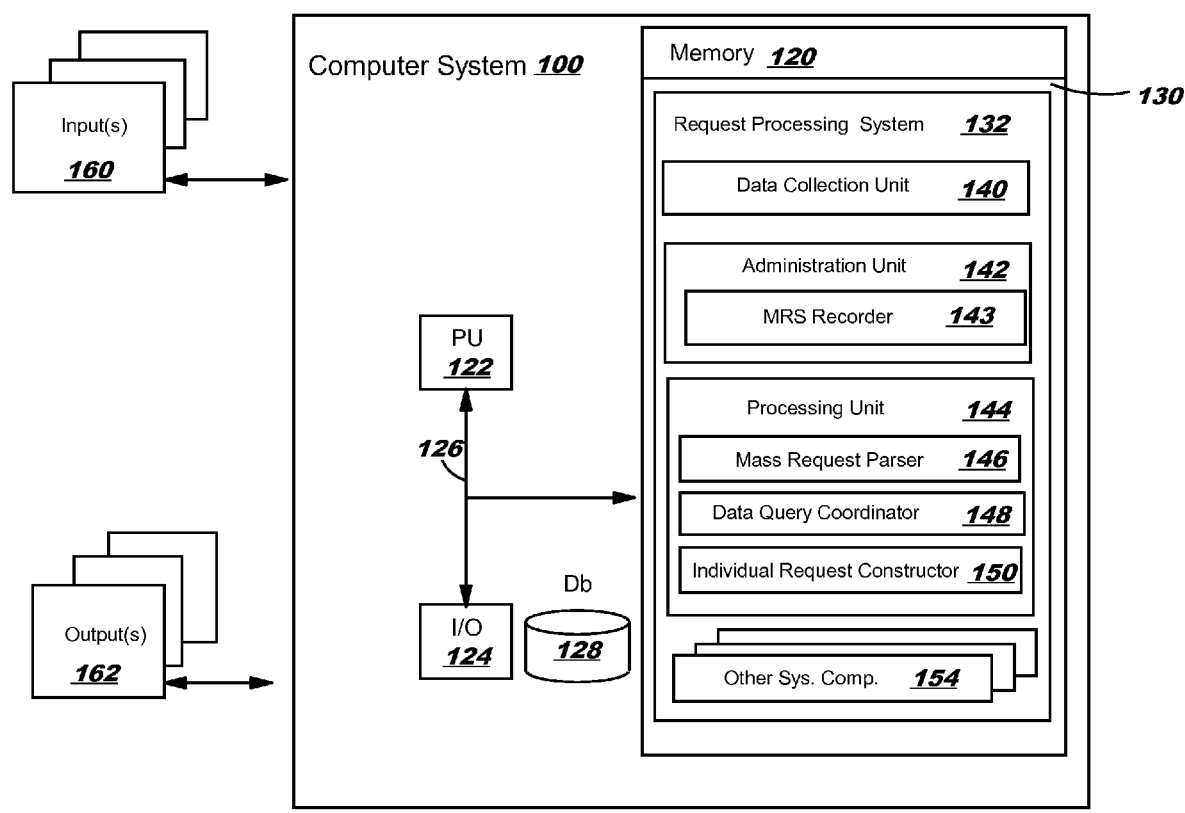
FIG. 2 shows a block diagram of an illustrative computer system according to an embodiment of the invention.

Referring to FIG. 2, a block diagram of an illustrative computer system 100 according to an embodiment of the invention is shown. In an embodiment, computer system 100 includes a memory 120, a processing unit (PU) 122, input/output devices (I/O) 124 and a bus 126. A database 128 may also be provided for storage of data relative to processing tasks. Memory 120 includes a program product 130 that, when executed by PU 122, comprises various functional capabilities described in further detail below. Memory 120 (and database 128) may comprise any known type of data storage system and/or transmission media, including magnetic media, optical media, random access memory (RAM), read only memory (ROM), a data object, etc. Moreover, memory 120 (and database 128) may reside at a single physical location comprising one or more types of data storage, or be distributed across a plurality of physical systems. PU 122 may likewise comprise a single processing unit, or a plurality of processing units distributed across one or more locations. I/O 124 may comprise any known type of input/output device including a network system, modem, keyboard, mouse, scanner, voice recognition system, CRT, printer, disc drives, etc. Additional components, such as cache memory, communication systems, system software, etc., may also be incorporated into computer system 100.

As shown in FIG. 2, program product 130 may include a request processing system 132. Request processing system 132 may function to implement request processing center 12 of FIG. 1. To this extent, request processing system 132 includes a data collection unit 140; an administration unit 142 including a mass request status (MRS) recorder 143; a processing unit 144 including a mass request parser 146, a data query coordinator 148, and an individual request constructor 150; and other system components 154. Other system components 154 may include any now known or later developed parts of a computer system 100 not individually delineated herein, but understood by those skilled in the art.

As discussed above, request processing system 132 may function to implement request processing center 12 of FIG. 1. To this extent, administration unit 142, processing unit 144, and data base 128 may implement administration unit 14, processing unit 16, and database 18 of FIG. 1, respectively.

Inputs 160 to computer system 100 include, for example, mass requests communicated from initiator systems 20 (FIG. 1). Those inputs may be communicated to computer system 100 through I/O 124 and may be stored in memory 120 or database 128, and/or may be collected by data collection unit 140. Outputs 162 of computer system 100 include, for example, child requests that may be communicated to destination systems 22 (FIG. 1). Outputs 162 may also include mass request status information to be communicated to the respective initiator system 20 (FIG. 1). The operation of request processing system 132 will be described in detail below.

3. Operation Methodology

FIG. 3 shows an embodiment of the operation of request processing system 132. Referring now to FIGS. 2-3, in process S1, data collection unit 140 collects data for a mass request communicated from an initiator system 20 (FIG. 1). According to an embodiment, a mass request data string may include an identification portion indicating, e.g., a type of the mass request, and a request content portion which contains the contents of the expected individual/child requests to destination systems 22 (FIG. 1). It should be appreciated that any manner of identifying a mass request may be used in the identification portion. Any data structure may be used for a mass request, and all are include in the invention. For example, the request content portion may be arranged in a spreadsheet type structure, i.e., including rows and columns, with each column (or row) representing a request content to a single destination system 22 (FIG. 1). Each request content may include a destination identification to indicate a respective destination system 22 (FIG. 1) to be communicated with.

In process S2, administration unit 142 reviews a mass request to determine whether it is qualified to be processed, i.e., approved. Any standard may be used in the review and all are included in the invention. If a mass request is determined as not qualified for processing, the mass request will be marked as rejected by mass request status (MRS) recorder 143, and may be queued to be cured by further actions. For example, administration unit 142 may set an upper limit for the number of destination systems 22 (FIG. 1) to be reached by a single mass request, e.g., 999. If a mass request contains request contents for more than 1000 destination systems 22 (FIG. 1), administration unit 142 may reject the mass request and may return it to the respective initiator system 20 (FIG. 1) for modification. In this case, administration unit 142 may suggest that the respective initiator system 20 (FIG. 1) issue two separate mass requests or delete some destinations. For another example, administration unit 142 may find that the data in the identification portion of a mass request cannot be recognized, e.g., not conforming to the saved identification data. In this case, the mass request will be rejected and an error message may be communicated to the respective initiator system 20 (FIG. 1). In addition, administration unit 142 may fix some minor problems with a mass request by itself as may be appreciated. For example, with respect to the upper limit example above, administration unit 142 may instruct processing unit 144 to process the mass request to the upper limit and return the excess of the mass request to the respective initiator system 20 (FIG. 1) to resolve in an additional request. If a mass request is determined as ready to be processed, the mass request will be queued to be processed by processing unit 144. Mass request status (MRS) recorder functions to record and update a status of a mass request in request processing system 132 and the updated status may be communicated to the respective initiator system 20 (FIG. 1).

In process S3, processing unit 144 processes a mass request to generate child requests. Process S3 includes three subprocesses. In sub-process S3-1, mass request parser 146 parses the received mass request. According to an embodiment, mass request parser 146 parses the mass request to separate the identification portion and the content portion, and parses the content portion to generate multiple individual content strings, with each content string corresponding to one destination system 22 (FIG. 1). As is appreciated, each generated content string includes a destination identification as in the mass request. As described above, in a mass request, the request content portion may be structured in a spreadsheet type structure, i.e., rows and columns. The parsing may not actually separate the spreadsheet structure, and may just make it more structured to separate the message content information for different destination systems (FIG. 1). In the case that the request content portion of a mass request is structured in other formats than a spreadsheet type, the parsing may involves more efforts to retrieve request content information for each destination system 22 (FIG. 1) to generate the individual content strings. It should be appreciated that any parsing method for any mass request data structure/format is possible and included in the current invention.

In sub-process S3-2, data query coordinator 148 queries database 128 for additional information. According to an embodiment, the additional information may include parent attributes of the mass request/child requests and the requirements of each destination system 22 (FIG. 1) for the child request communicated to it, e.g., message format requirements. A parent attribute is an attribute common to all child requests. The parent attribute may be indicated by a parent ID within the identification portion. To this extent, data query coordinator 148 queries data base 128 based on the parent ID in the identification portion to retrieve all the parent attributes.

For the message format information of a destination system 22 (FIG. 1), data query coordinator 148 may query database 128 based on the destination identification (ID) of the respective content string. A destination ID may be included in the message string in any manner, and all are included in the invention.

In sub-process S3-3, individual request constructor 150 generates a child request based on the parsed data in sub-process S3-1 and the retrieved additional data in sub-process S3-2. For example, individual request constructor 150 combines the parent attributes and each content string and restructures the information based on the retrieved message format information to generate child requests.

After the mass request has been processed to generate child requests to be communicated to destination systems 22 (FIG. 1), mass request status (MRS) recorder 143 will update the status of the mass request to reflect this progress. Further, MRS recorder 143 may record the transmission and receipt/acceptance of a child request to the respective destination system 22 (FIG. 1).

Additional features of the current invention includes updating database 128 to reflect new destination systems 22 added to system 10 (FIG. 1) and new parent attributes, e.g., new types of e-business services provided by request processing center 12 (FIG. 1). In addition, initiator system 20 (FIG. 1) may include a mass request generation system that automatically generates a mass request data string based on information input by a user. For example, a user may indicate through a GUI that a mass request is needed, and input necessary information, and the mass request generation system may generate a mass request that can be recognized by request processing center 12 based on the information.

4. Conclusion

While shown and described herein as a method and system for communicating requests to multiple destinations in a business transaction, it is understood that the invention further provides various alternative embodiments. For example, in an embodiment, the invention provides a program product stored on a computer-readable medium, which when executed, enables a computer infrastructure to communicate requests to multiple destinations in a business transaction. To this extent, the computer-readable medium includes program code, such as request processing system 132 (FIG. 2), which implements the process described herein. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computing device, such as memory 120 (FIG. 2) and/or database 128 (FIG. 2), and/or as a data signal traveling over a network (e.g., during a wired/wireless electronic distribution of the program product).

In another embodiment, the invention provides a method of generating a system for communicating requests to multiple destinations in a business transaction. In this case, a computer infrastructure, such as computer system 100 (FIG. 2), can be obtained (e.g., created, maintained, having been made available to, etc.) and one or more systems for performing the process described herein can be obtained (e.g., created, purchased, used, modified, etc.) and deployed to the computer infrastructure. To this extent, the deployment of each system can comprise one or more of: (1) installing program code on a computing device, such as computing system 100 (FIG. 2), from a computer-readable medium; (2) adding one or more computing devices to the computer infrastructure; and (3) incorporating and/or modifying one or more existing systems of the computer infrastructure to enable the computer infrastructure to perform the process steps of the invention.

In still another embodiment, the invention provides a business method that performs the process described herein on a subscription, advertising supported, and/or fee basis. That is, a service provider could offer to communicate requests to multiple destinations in a business transaction as described herein. In this case, the service provider can manage (e.g., create, maintain, support, etc.) a computer infrastructure, such as computer system 100 (FIG. 2), that performs the process described herein for one or more customers and communicates the results to the one or more customers. In return, the service provider can receive payment from the customer(s) under a subscription and/or fee agreement and/or the service provider can receive payment from the sale of advertising to one or more third parties.

As used herein, it is understood that the terms "program code" and "computer program code" are synonymous and mean any expression, in any language, code or notation, of a set of instructions that cause a computing device having an information processing capability to perform a particular function either directly or after any combination of the following: (a) conversion to another language, code or notation; (b) reproduction in a different material form; and/or (c) decompression. To this extent, program code can be embodied as one or more types of program products, such as an application/software program, component software/a library of functions, an operating system, a basic I/O system/driver for a particular computing and/or I/O device, and the like. Further, it is understood that the terms "component" and "system" are synonymous as used herein and represent any combination of hardware and/or software capable of performing some function(s).

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A method for communicating requests to multiple destinations in a business transaction, the method comprising:
   receiving a mass request, the mass request including an identification portion and a content portion;
   parsing the content portion to generate multiple content strings using a computer, each content string corresponding to one destination;
   retrieving a parent attribute based on the identification portion using the computer wherein the parent attribute includes message format requirements of each of the multiple destinations; and
   combining the parent attribute to each content string to generate individual requests to be communicated to the respective multiple destinations using the computer.

2. The method of claim 1, wherein a content string includes destination identification information to indicate a respective destination.

3. The method of claim 2, further comprising retrieving message format information for the respective destination based on the destination identification information within the content string.

4. The method of claim 3, wherein the message format information is used in generating a respective individual request.

5. The method of claim 1, wherein the content portion of the mass request is arranged in a structure including a row and a column.

6. The method of claim 1, further comprising reviewing the received mass request to determine whether the mass request is qualified to be further processed.

7. The method of claim 1, further comprising recording and updating a status of the mass request.

8. A system for communicating requests to multiple destinations in a business transaction, the system comprising:
   a unit for receiving a mass request, the mass request including an identification portion and a content portion;
   a unit for parsing the content portion to generate multiple content strings, each content string corresponding to one destination;
   a unit for retrieving a parent attribute based on the identification portion wherein the parent attribute includes message format requirements of each of the multiple destinations; and
   a unit for combining the parent attribute to each content string to generate individual requests to be communicated to the respective multiple destinations.

9. The system of claim 8, wherein a content string includes destination identification information to indicate a respective destination.

10. The system of claim 9, wherein the unit for retrieving a parent attribute further retrieves message format information for the respective destination based on the destination identification information within the content string.

11. The system of claim 10, wherein the message format information is used in generating a respective individual request.

12. The system of claim 8, wherein the content portion of the mass request is arranged in a structure including a row and a column.

13. The system of claim 8, further comprising a unit for reviewing the received mass request to determine whether the mass request is qualified to be further processed.

14. The system of claim 8, further comprising a unit for recording and updating a status of the mass request.

15. A computer program product comprising:
   computer usable program code stored on a computer storage medium which, when executed by a computer system, is configured to:
   receive a mass request, the mass request including an identification portion and a content portion;
   parse the content portion to generate multiple content strings, each content string corresponding to one destination;
   retrieve a parent attribute based on the identification portion wherein the parent attribute includes message format requirements of each of the multiple destinations; and
   combine the parent attribute to each content string to generate individual requests to be communicated to the respective multiple destinations.

16. The program product of claim 15, wherein a content string includes destination identification information to indicate a respective destination.

17. The program product of claim 16, wherein the program code is further configured to retrieve message format information for the respective destination based on the destination identification information within the content string, the message format information being used in generating a respective individual request.

18. The program product of claim 15, wherein the content portion of the mass request is arranged in a structure including a row and a column.

19. The program product of claim 15, wherein the program code is further configured to review the received mass request to determine whether the mass request is qualified to be further processed.

20. The program product of claim 15, wherein the program code is further configured to record and update a status of the mass request.

21. A method for deploying a system for communicating requests to multiple destinations in a business transaction, the method comprising:

providing a computer infrastructure being operable to:

receive a mass request, the mass request including an identification portion and a content portion;

parse the content portion to generate multiple content strings, each content string corresponding to one destination;

retrieve a parent attribute based on the identification portion wherein the parent attribute includes message format requirements of each of the multiple destinations; and combine the parent attribute to each content string to generate individual requests to be communicated to the respective multiple destinations.

22. The method of claim 21, wherein a content string includes destination identification information to indicate a respective destination.

23. The method of claim 22, wherein the computer infrastructure is further operable to retrieve message format information for the respective destination based on the destination identification information within the content string, the message format information being used in generating a respective individual request.

24. The method of claim 21, wherein the content portion of the mass request is arranged in a structure including a row and a column.

25. The method of claim 21, wherein the computer infrastructure is further operable to review the received mass request to determine whether the mass request is qualified to be further processed.

26. The method of claim 21, wherein the computer infrastructure is further operable to record and update a status of the mass request.

* * * * *